United States Patent
Armstrong

(10) Patent No.: US 6,982,637 B2
(45) Date of Patent: Jan. 3, 2006

(54) SELECTABLE FLASH SEQUENCE FOR A ROAD VEHICLE LIGHT SYSTEM

(76) Inventor: Neil Alistair Armstrong, Wildern Farmhouse, Goodalls Lane, Hedge End, Southampton (GB) SO30 4QR ( * ) Notice: Subject to any disclaimer, the term of this patent is extended or adjusted under 35 U.S.C. 154(b) by 0 days.

(21) Appl. No.: 10/137,780

(22) Filed: May 2, 2002

(65) Prior Publication Data

US 2002/0190847 A1    Dec. 19, 2002

(30) Foreign Application Priority Data

May 3, 2001    (GB) .................................. 0110836

(51) Int. Cl.
*B60Q 1/26*    (2006.01)

(52) U.S. Cl. ...................... 340/468; 340/331; 340/471; 340/475; 340/477; 307/10.1; 307/10.8

(58) Field of Classification Search ................ 340/468, 340/331, 458, 475, 477, 479, 480, 483, 471; 315/77, 200 A; 307/10.1, 10.8
See application file for complete search history.

(56) References Cited

U.S. PATENT DOCUMENTS

| | | | | |
|---|---|---|---|---|
| 3,925,759 A | * | 12/1975 | Lucas ......................... | 340/468 |
| 5,072,210 A | * | 12/1991 | Kimmelman ............... | 340/458 |
| 5,119,067 A | * | 6/1992 | Adell ......................... | 340/468 |
| 5,212,468 A | * | 5/1993 | Adell ......................... | 340/469 |
| 5,563,577 A | * | 10/1996 | Adkins ....................... | 340/468 |
| 5,578,986 A | * | 11/1996 | Isobe et al. ................. | 340/475 |
| 5,808,545 A | * | 9/1998 | Brueggemann et al. ..... | 340/468 |
| 6,028,512 A | * | 2/2000 | Schropp et al. ............. | 340/471 |
| 6,087,932 A | | 7/2000 | Belgard | |
| 6,154,126 A | * | 11/2000 | Beasley et al. ............. | 340/468 |
| 6,236,311 B1 | * | 5/2001 | Anderson ................... | 340/468 |
| 6,243,009 B1 | * | 6/2001 | Fritz et al. ................. | 340/471 |
| 2002/0000912 A1 | | 1/2002 | DeYoung | |

FOREIGN PATENT DOCUMENTS

GB    2222919 A    3/1990

* cited by examiner

*Primary Examiner*—Davetta W. Goins
(74) *Attorney, Agent, or Firm*—Baker Botts LLP

(57) ABSTRACT

A road vehicle road vehicle direction indicator light system 1 comprises front and rear lamps 2, 4 for the nearside and front and rear lamps 6, 8 for the offside of the vehicle, a battery 10 power source connected to an ignition switch 12, a hazard warning switch 14 and a flasher control unit 16 connected to an indicator switch 18. With the exception of the flasher control unit 16 the other individual elements of the road vehicle indicator light system 1 are fairly standard.

Figure 1:
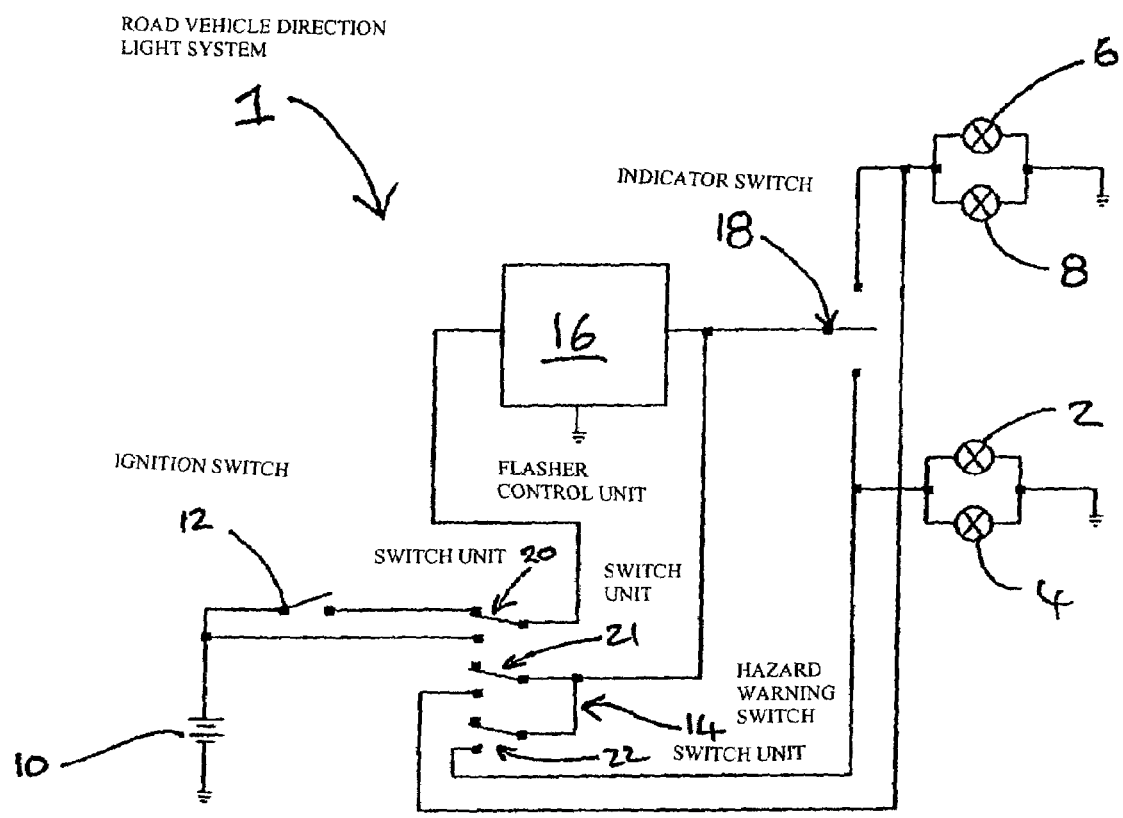

The flasher control unit 16 is electronically controlled and comprises a microprocessor having a plurality of selectable lamp flash sequences stored in a non-volatile memory. The lamp flash sequences maybe pre-programmed into the non-volatile memory. Each flash sequence is assigned a unique number within the microprocessor coding. The flasher unit 16 has a receivable input signal from the indicator switch 18. The flasher unit 16 controls the frequency of the on/off flashing of the lamps 2, 4, 6, 8.

7 Claims, 1 Drawing Sheet

SELECTABLE FLASH SEQUENCE FOR A ROAD VEHICLE LIGHT SYSTEM

The present invention relates to a selectable flash sequence for a road vehicle light system and method of selecting a flash sequence.

Known indicator lamps on road vehicles are controlled by a device commonly known as a flasher unit. On earlier vehicles the method of operation of the flasher unit was by mechanical means but more modern flasher units tend to be controlled electronically. Both the frequency and duty cycle of the flashing lamps are typically constant on both mechanical and electronic flasher units. One feature of the electronic flasher unit is an automatically increased flash frequency, typically double, if there is a lamp bulb failure. This feature is used to alert the drive of the fault.

The flashing indicator lamps of a road vehicle are commonly used for indicating the direction in which a driver of the vehicle intends to turn and when all of the lamps are flashing for providing a hazard warning.

According to a first aspect of the present invention there is provided a method of selecting a flash sequence from a plurality of flash sequences stored in control means for an indicator lamp system of a road vehicle, the method comprising performing a predefined switching sequence that comprises a plurality of steps.

The method preferably comprises a first stage of placing the control means in a flash selection mode by performing a predefined switching sequence and a second stage of selecting a flash sequence from a plurality of flash sequences stored in the control means by performing a predefined switching sequence.

Preferably, the method comprises performing a predefined switching sequence incorporating the use of a vehicle ignition switch.

The method preferably comprises performing a predefined switching sequence incorporating the use of the vehicle ignition switch and one or more of the vehicle light switches.

Preferably the method comprises performing a predefined switching sequence incorporating the use of the vehicle ignition switch and a vehicle hazard warning lights switch.

The method comprises performing a predefined switching sequence incorporating the use of the vehicle ignition switch and preferably one or more of the vehicle indicator light switches.

According to a second aspect of the present invention there is provided a method of selecting a flash sequence for use as a direction indicator of a road vehicle indicator lamp system from a plurality of flash sequences stored in control means for the indicator lamp system, the method comprising performing a predefined switching sequence.

The method preferably comprises a first stage of placing the control means in a flash selection mode by performing a predefined switching sequence and a second stage of selecting a flash sequence from a plurality of flash sequences stored in the control means by performing a predefined switching sequence.

The method preferably comprises performing a predefined switching sequence comprising a plurality of steps.

Preferably, the method comprises performing a predefined switching sequence incorporating the use of a vehicle ignition switch.

The method preferably comprises performing a predefined switching sequence incorporating the use of the vehicle ignition switch and one or more of a vehicle light switches.

The method comprises performing a predefined switching sequence incorporating the use of the vehicle ignition switch and preferably one or more of a vehicle indicator light switches.

According to a third aspect of the present invention there is provided a road vehicle direction indicator light system comprising lamps for the nearside and offside of the vehicle and a plurality of selectable lamp flash sequences stored in a control unit, the arrangement being such that in use one of the lamp flash sequences is pre-selected for use as the flash sequence of the direction indicator light system.

The plurality of selectable lamp flash sequences preferably comprises flash sequences each having a different frequency and/or different lamp-on, lamp-off duty cycle.

Preferably, at least one of the selectable lamp flash sequences comprises a set of lamp flashes separated by a period of non-lamp activation.

In an embodiment of the present invention the nearside and offside lamps of the road vehicle direction indicator light system and the plurality of selectable lamp flash sequences stored in the control unit are preferably usable as a hazard warning system the arrangement being such that one of the lamp flash sequences is pre-selected for use as the flash sequence of the nearside lamps and the offside lamps.

The present invention may be carried into practice in various ways but an embodiment will now be described, by way of example only, with reference to the accompanying drawing in which:

FIG. 1 is a schematic representation of an electrical layout of a indicator light system for a road vehicle.

With reference to FIG. 1, a road vehicle direction indicator light system 1 comprises front and rear lamps 2, 4 for the nearside and front and rear lamps 6, 8 for the offside of the vehicle, a battery 10 power source connected to an ignition switch 12, a hazard warning switch 14 and a flasher control unit 16 connected to an indicator switch 18. With the exception of the flasher control unit 16 the other individual elements of the road vehicle indicator light system 1 are fairly standard.

The flasher control unit 16 is electronically controlled and comprises a microprocessor having a plurality of selectable lamp flash sequences stored in a non-volatile memory. The lamp flash sequences maybe pre-programmed into the non-volatile memory. Each flash sequence is assigned a unique number within the microprocessor coding. The flasher unit 16 has a receivable input signal from the indicator switch 18. The flasher unit 16 controls the frequency of the on/off flashing of the lamps 2, 4, 6, 8.

The hazard warning switch 14 comprises three switch units 20, 21, 22. Switch units 21, 22 are in the open condition in FIG. 1. Switch unit 20 is shown in a first position touching a terminal connected to the ignition switch 12. A second position of the switch unit 20 connects the unit switch 20 to the battery 10. When in the second position the switch unit 20 provides a direct connection between the battery 10 and the flasher control unit 16. When in the first position the switch unit 20 provides a connection between the ignition switch 12 and the flasher control unit 16.

To select a particular flash sequence stored in the flasher control unit 16 the operator first puts the flasher control unit 16 into a "flash sequence selection mode" by performing a pre-defined switching sequence. The switching sequence may include the use of the ignition switch 12 and the indicator switch 18. An example of a switching sequence to enter the flash sequence selection mode of the control unit 16 is as follows:

Open the ignition switch 12; turn indicator switch 18 to closed position (left or right direction); close the ignition switch 12, and wait a few seconds; open the indicator switch 18 and wait a few seconds, then close the ignition switch 12.

The skilled addressee shall appreciate that the switching sequence to enter the flash sequence selection mode of the control unit 16 may comprise any number of different permutations and combinations of open/close switching operations. However, such sequences should not include switching combination that would be encountered during the normal use of the indicator switch 18 and the ignition switch 12. This is to ensure that the flash sequence selection mode is not accidentally entered during normal use of the vehicle.

Once the flash sequence selection mode of the flasher control unit 16 has been invoked each of the pre-programmed flash sequences is displayed by the flashing of the indicator lamps. The indicator switch 12 may be used to invoke a short demonstration of each pre-programmed sequence, for example:

Open indicator switch 18 and the close indicator switch 18 again.

The selection of one of the flash sequences may be by the termination of the flash sequence selection mode again by performing another switching sequence incorporating the use of the ignition switch 12 and/or the indicator switch 18. Upon termination of the flash sequence selection mode the number assigned to the last flash sequence displayed shall be stored in the non-volatile memory of the control unit 16 for retrieval and subsequent use whenever the indicator lamps 2, 4, 6, 8 are used.

We believe that lamps that flash at a higher frequency are often more eye-catching than those which flash at a lower frequency, and with the use of irregular flash patterns the effect may be further enhanced.

By incorporating the flasher control unit 16 in the road vehicle direction indicator light system 1 it is possible to provide a flasher unit that incorporates several different selectable flash sequences or patterns. A particular sequence may be selected for a particular road condition. For example the more dangerous the road condition the higher the flashing frequency. The flash sequences may include several lamp-on and lamp-off periods of various time periods. Each flash sequence may be continuously repeatable when the indicator lamps are operated.

What is claimed is:

1. A method of selecting a flash sequence from a plurality of flash sequences stored in control means for directional indicator lamp system of a road vehicle, the method comprising performing a predefined switching sequence that comprises a plurality of steps, wherein the method comprises a first stage of placing the control means in a flash selection mode by performing a predefined switching sequence using firstly one or more of the directional indicator lamp switches and secondly using a vehicle ignition switch, and a second stage of selecting a flash sequence from a plurality of flash sequences stored in the control means by performing a predefined switching sequence incorporating the use of one or more of the vehicle directional indicator light switches.

2. A method of selecting a flash sequence as claimed in claim 1, wherein the method comprises performing a predefined switching sequence further incorporating the use of the vehicle ignition switch and one or more of the vehicle light switches.

3. A method of selecting a flash sequence as claimed in claim 1, wherein the method comprises performing a predefined switching sequence further incorporating the use of the vehicle ignition switch and a vehicle hazard warning lights switch.

4. A road vehicle direction indicator light system comprising lamps for the nearside and offside of the vehicle, a plurality of selectable lamp flash sequences stored in a control means, and a plurality of switches, the system being operative according to a first stage wherein, in use, the control means is placed in a flash selection mode by performing a predefined switching sequence using firstly one or more of the directional indicator lamp switches and secondly using a vehicle ignition switch, the system being operative according to a second stage wherein a direction indicator lamp flash sequence is selected from the plurality of lamp flash sequences by performing a predetermined switching sequence incorporating the use of one or more of the vehicle directional indicator switches.

5. A road vehicle direction indicator light system as claimed in claim 4, wherein the plurality of selectable lamp flash sequences comprise flash sequences each having a different frequency and/or different lamp-on, lamp-off duty cycle.

6. A road vehicle direction indicator light system as claimed in claim 4, wherein at least one of the selectable lamp flash sequences comprises a set of lamp flashes separated by a period of non-lamp activation.

7. A road vehicle direction indicator light system as claimed in claim 4, wherein the nearside and offside lamps of the road vehicle direction indicator light system and the plurality of selectable lamp flash sequences stored in the control unit are usable as a hazard warning system the arrangement being such that one of the lamp flash sequences is pre-selected for use as the flash sequences of the nearside lamps and the offside lamps.

* * * * *